(12) United States Patent
Attal et al.

(10) Patent No.: US 10,913,153 B2
(45) Date of Patent: Feb. 9, 2021

(54) METHOD FOR ASSISTING AT LEAST ONE MOVEMENT OF A USER AND CORRESPONDING DEVICE

(71) Applicant: SAFRAN ELECTRONICS & DEFENSE, Boulogne Billancourt (FR)

(72) Inventors: Hugo Attal, Boulogne Billancourt (FR); Roland Thieffry, Boulogne Billancourt (FR); Jordane Grenier, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 16/635,462

(22) PCT Filed: Jul. 25, 2018

(86) PCT No.: PCT/EP2018/070225
§ 371 (c)(1),
(2) Date: Jan. 30, 2020

(87) PCT Pub. No.: WO2019/025266
PCT Pub. Date: Feb. 7, 2019

(65) Prior Publication Data
US 2020/0376658 A1    Dec. 3, 2020

(30) Foreign Application Priority Data
Jul. 31, 2017    (FR) .................................... 17 57280

(51) Int. Cl.
*B25J 9/16*    (2006.01)
*B25J 9/00*    (2006.01)

(52) U.S. Cl.
CPC ........... *B25J 9/1633* (2013.01); *B25J 9/0006* (2013.01)

(58) Field of Classification Search
CPC ........ B25J 9/163; B25J 9/1633; B25J 9/0006; G05D 1/0274
USPC .............................................. 700/245; 601/35
See application file for complete search history.

(56) References Cited

U.S. PATENT DOCUMENTS

| 2010/0318099 | A1* | 12/2010 | Itkowitz ................. A61B 34/30 606/130 |
| 2013/0253385 | A1* | 9/2013 | Goffer .................. A61H 1/0255 601/35 |
| 2013/0268120 | A1* | 10/2013 | Grygorowicz ......... B25J 13/085 700/264 |
| 2014/0188279 | A1* | 7/2014 | Lee ........................ B25J 9/1607 700/263 |
| 2015/0217444 | A1 | 8/2015 | Asada et al. |

* cited by examiner

*Primary Examiner* — Dalena Tran
(74) *Attorney, Agent, or Firm* — Muncy, Geissler, Olds & Lowe, P.C.

(57) ABSTRACT

A method of assisting at least one movement of a user by means of a robotic device, the method enabling the robotic device to be caused to operate in at least the following two modes: default mode: force servocontrol of the robotic device via a computer of the robotic device; and measurement mode: path servocontrol of the robotic device, via the computer, with the computer storing at least one force exerted on the robotic device by an environment external to the robotic device in order to perform the force servocontrol of the default mode.

8 Claims, 2 Drawing Sheets

METHOD FOR ASSISTING AT LEAST ONE MOVEMENT OF A USER AND CORRESPONDING DEVICE

The invention relates to a method of assisting at least one movement of a user. The invention also relates to a corresponding device

TECHNOLOGICAL BACKGROUND OF THE INVENTION

Nowadays, robotic devices can enable the movement of a user to be assisted in numerous fields such as medicine, national security, . . . . Exoskeletons are thus known that are worn by a user and that participate in the user's movements in order to make it easier to perform tasks such as carrying an object, pushing or pulling an object . . . . An exoskeleton enables the user's strength to be increased artificially, thereby limiting user fatigue.

In order to enable an exoskeleton to assist a user effectively, it is nevertheless necessary to have knowledge of the external forces being applied and also of the weights of the objects being transported. Specifically, it must be possible to control the exoskeleton so that it can compensate these forces automatically as accurately and as quickly as possible.

Usually, external forces are estimated by means of additional indicator elements that are arranged in the environment or on the exoskeleton (camera, radio frequency identification (RFID) technology, strain gauges . . . ), and likewise that are associated with the user (my electrical technology, user/environment interface, . . . ).

The user is thus required to wear sensors directly and/or to interact with an interface, thereby making the exoskeleton less ergonomic to wear.

Furthermore, use of the exoskeleton is limited to applications that are not very complex, e.g. such as a static application in a factory enabling marketers to be placed more easily, typically for automatically specifying the weight and the physical properties of an object that is to be carried.

OBJECT OF THE INVENTION

An object of the invention is to propose a method of assisting at least one movement of the user, which method is more ergonomic for the user.

An object of the invention is also to propose a corresponding device.

BRIEF SUMMARY OF THE INVENTION

In order to achieve this object, there is provided a method of assisting at least one movement of a user by means of a robotic device, the method enabling the robotic device to be caused to operate in at least the following two modes:
  default mode: force servocontrol of the robotic device via a computer of the robotic device; and
  measurement mode: path servocontrol of the robotic device, via the computer, with the computer storing at least one force exerted on the robotic device by an environment external to said robotic device;
  the method being defined:
  during recognition by the computer of a movement performed by the robotic device, to switch from default mode to measurement mode in order to store at least one force exerted on the robotic device by an environment external to the robotic device; and then
  to return to default mode while making use of said stored force to perform the force servocontrol in said default mode.

As a result, the invention makes it possible to switch regularly between path servocontrol and force servocontrol, with path servocontrol thus making it possible, temporarily, to inform of the computer about the external force(s) being applied to the robotic device, and with force servocontrol serving to assist the user in making the movement. This thus serves to contribute to obtaining good operation of the robotic device.

The invention thus makes it possible to limit the number of indicator elements that are worn directly by the user or with which the user needs to interact.

The inventors have thus been able to develop a robotic device that operates without any sensor being worn directly by the user, and in particular without any biometric sensor, and also without any user/environment interface via which users have conventionally identified the level of assistance that the robotic device is to provide.

The invention thus makes the movement assistance more ergonomic for the user.

In addition, the invention can be used for applications that are relatively complex. It is thus possible to envisage using the invention in an environment that is unknown.

In a particular embodiment, the computer performs automatic learning of at least one movement carried out by the robotic device.

In a particular embodiment, the automatic learning is performed during default mode.

Thus, switching between the two modes of servocontrol thus takes place more and more frequently as the computer learns the possible movements of the robotic device, thereby enabling the robotic device to improve its performance more and more over time.

In a particular embodiment, the automatic learning is performed during a dedicated preliminary stage.

In a particular embodiment, the path servocontrol is servocontrol via a run of positions.

In a particular embodiment, the path servocontrol is velocity servocontrol.

In a particular embodiment, the robotic device is an exoskeleton.

The invention also provides a robotic device comprising a computer configured to provide force servocontrol of the robotic device, the computer being arranged, during recognition of a movement carried out by the robotic device, to provide the robotic device with path servocontrol while storing at least one force exerted by an external environment on the robotic device so that, on returning to force servocontrol, it can make use of the stored force(s) to perform force servocontrol.

Other characteristics and advantages of the invention appear on reading the following description of a particular, nonlimiting embodiment of the invention.

BRIEF DESCRIPTION OF THE DRAWINGS

The invention can be better understood in the light of the following description given with reference to the accompanying figures, in which.

DETAILED DESCRIPTION OF THE INVENTION

Figure 1:
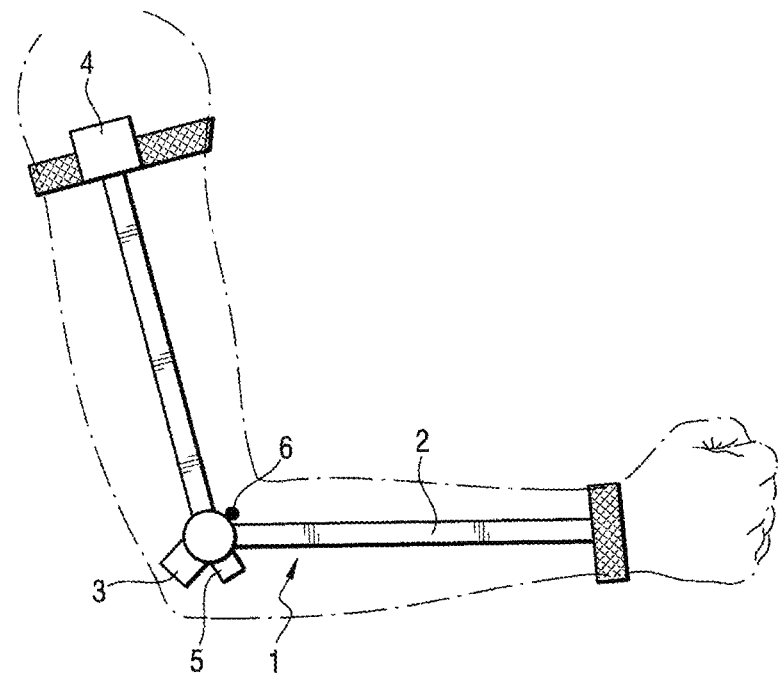
FIG. 1 is a diagrammatic view of a robotic device in a particular embodiment of the invention.

With reference to FIG. 1, and by way of example, a particular implementation of the method is performed in an exoskeleton 1.

Naturally, this application is not limiting, and the method may be implemented in any type of robotic device, e.g. in a comanipulation robot, in a guidance system for an aircraft or for any other transport means . . . . The device could also be a system for aiming at and tracking a target. In addition to, or as a replacement for tracking by image processing, said system can thus make use of the forces applied by the user to a guide member (such as a handle, a joystick, . . . ) in order to track the target. For example, as soon as the computer can recognize a path followed by the guide member, said computer can switch to calculation mode in order to determine the forces being exerted on the guide member. The robotic device (or robot) can thus be arranged to deliver an additional force to the user in order to compensate for the forces required to interact with objects and/or to perform muscular activity that is tiring and/or arduous.

In this example, and in conventional manner, the exoskeleton 1 comprises:
- a mechanical structure 2 having one or more degrees of freedom that is worn by the user;
- one or more actuators 3 associated with the mechanical structure 2 to move the mechanical structure 2 in the one or more degrees of freedom of the mechanical structure 2; and
- a computer 4 serving to control the actuators 3.

By way of example, the actuators 3 may be motors.

In a particular embodiment, the exoskeleton 1 also includes at least one path sensor 5 (for estimating the position and/or the velocity of the mechanical structure 2). By way of example, the path sensor 5 may be an angular position sensor. In this example, the path sensor 5 is arranged at the pivot connection between two articulated elements of the mechanical structure 2 in order to measure the angular position of one of the elements relative to the other.

Preferably, the exoskeleton 1 also includes at least one force sensor 6 (for estimating one or more forces (which may be linear forces and/or torques) being applied to the mechanical structure 2). By way of example, said sensor 6 may be a torque sensor. In this example, it is situated between the actuator 3 serving to drive pivoting between the two articulated elements of the mechanical structure 2, and the mechanical structure 2 itself.

Figure 2:
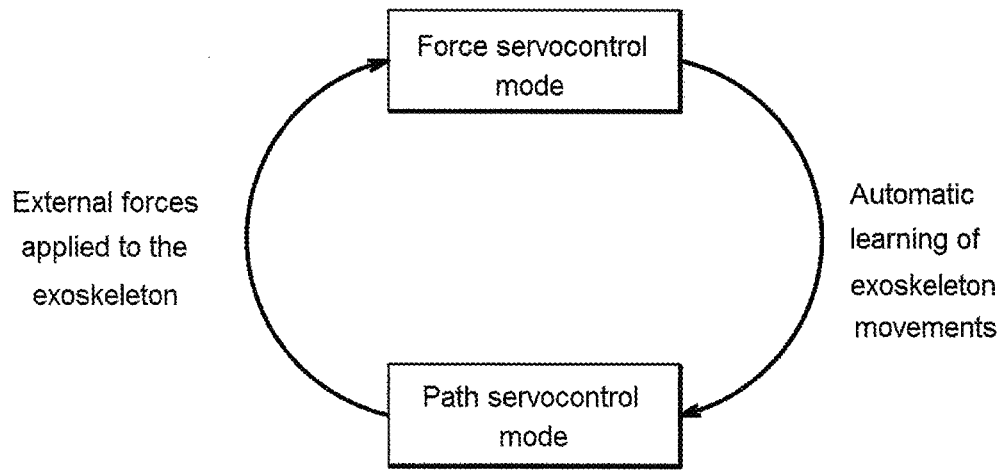
FIG. 2 shows diagrammatically the transition between the two modes of operation of the device shown in FIG. 1.
Figure 3A:
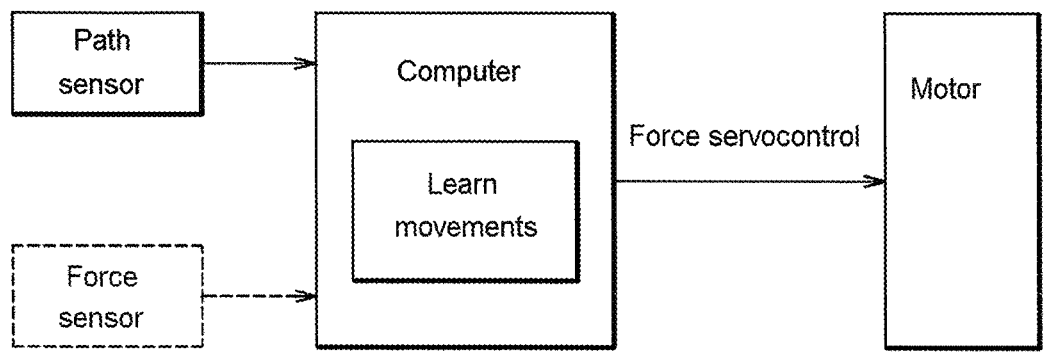
FIG. 3a shows diagrammatically the FIG. 1 device while it is operating in default mode.
Figure 3B:
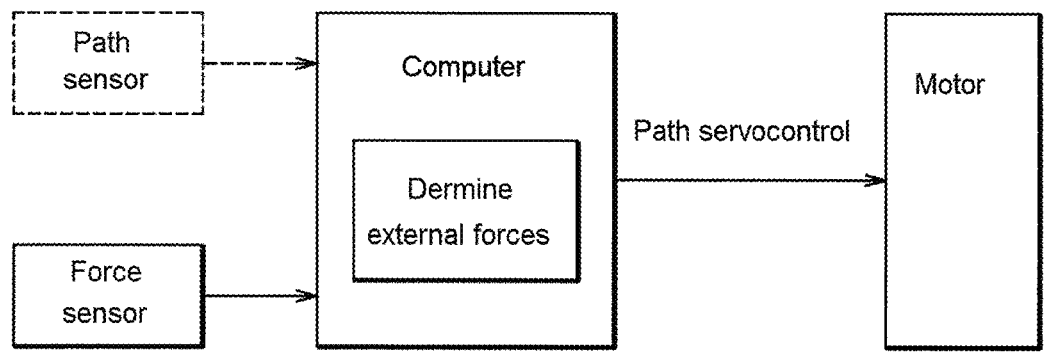
FIG. 3b shows diagrammatically the FIG. 1 device while it is operating in measurement mode.

With reference to FIGS. 2, 3a, and 3b, the exoskeleton 1 is configured to be capable of operating in two different modes: a default mode; and a measurement mode.

In the default mode, the computer 4 provides force servocontrol of the exoskeleton 1. The term "force" is used herein to cover both servocontrol acting on force proper and also servocontrol acting on torque.

Preferably, in this default mode, the computer 4 simultaneously performs automatic learning of the movements carried out by the exoskeleton 1, which movements are thus associated with the movements of the user.

It should be recalled that automatic or "machine" learning is a method that enables changes to be made by performing a systematic process instead of by making use of conventional algorithms, which are too limited for performing the intended task. This type of learning is well known to the person skilled in the art, and is therefore not described in detail herein.

Typically, the computer 4 has a database in which it stores models of the movements carried out by the exoskeleton 1 during force servocontrol (e.g. while the torque being applied to the user by the exoskeleton 1 is equal to zero).

In measurement mode, the computer 4 applies path servocontrol to the exoskeleton 1. The term "path" is used herein to cover both servocontrol performed by servocontrolling a run of positions (which may optionally be angular positions) and also by servocontrolling velocity (e.g. by following a velocity curve). In this example it is preferred to perform servocontrol by servocontrolling a run of positions for the exoskeleton 1.

It should be observed at this point, that servocontrolling a "run" of positions is used to mean that the exoskeleton 1 is to be caused to reproduce a movement, which movement is thus defined as a succession of positions.

Simultaneously, in measurement mode, the computer 4 stores the force(s) exerted on the exoskeleton 1 by the environment external to the exoskeleton 1 in order subsequently to reinject this data into force servocontrol when changing over to default mode.

It should be observed that in this measurement mode, the computer 4 predicts the movement of the user and applies corresponding position servocontrol to the exoskeleton 1. This serves to minimize as much as possible any direct impact of the user on measuring the forces being exerted on the exoskeleton 1 by the environment external to the exoskeleton 1.

Preferably, in this measurement mode, the computer 4 stores at least one force exerted on the exoskeleton 1 by an environment external to said exoskeleton 1 providing the direction of said force is known, and if that direction is not known, at least two forces are stored in order to determine it. In reality, said at least two forces result from the action of a single object on the exoskeleton 1, but they are measured at different instants: since the exoskeleton 1 moves between those two instants, the force varies in the meanwhile, thereby giving rise to the notion of "two" forces. By comparing the force measurements taken at two different instants, the computer 4 can thus estimate the resultant and the direction of the action exerted by the object on the exoskeleton 1.

There follows a description of the operation of the exoskeleton 1.

In an initial state, the exoskeleton 1 is in its default mode. The exoskeleton 1 thus assists the user in executing tasks by performing force servocontrol. Simultaneously, the computer 4 automatically learns the movements carried out by the exoskeleton 1 and stores them in its database.

When the computer 4 determines that a movement being carried out by the exoskeleton 1 corresponds to a movement that the computer 4 has already learnt and stored, the computer 4 switches to measurement mode. Typically, the signals supplied by the path sensor 5 are processed by the computer 4: when one of the signals corresponds to a signal known to the computer 4, said computer 4 switches the exoskeleton 1 into measurement mode.

The computer 4 also continuously extrapolates how the received signal is going to vary, by using one or more movement models contained in its database, in order to estimate the movement that the exoskeleton 1 is supposed to perform. On the basis of this assumed movement for the exoskeleton 1, the computer 4 applies path servocontrol to the exoskeleton 1.

On switching to measurement mode, it is thus the exoskeleton 1 that gives rise to the movement, and no longer the user. Under such circumstances, it is the exoskeleton 1 on its own that withstands the force(s) applied to the exoskeleton 1 by the external environment. As mentioned above, in measurement mode, it is considered that the forces exerted directly on the exoskeleton 1 by the user are negligible (specifically, as a result of the automatic learning, the path servocontrol compensates the user's muscular force).

The data supplied by the force sensor 6 is thus representative of the force(s) that the exoskeleton 1 is itself to apply to the environment in order to be able to follow the path determined by the computer 4. On the basis of the data supplied by the force sensor 6, the computer 4 thus deduces the force(s) being exerted by the external environment on the exoskeleton 1 for compensation by the exoskeleton 1.

For example, if the user is carrying a heavy object without supplying any muscular force, the user's arm tends to straighten out, but in reality, in measurement mode, the exoskeleton 1 holds that arm as a result of the action of the actuators 3. The torque induced by the object being carried is thus measured by a "micro torsion" effect at the sensor 6.

Once this has been determined, the computer 4 switches to default mode. The force delivered by the user is then once more added to the force delivered by the exoskeleton 1. The computer 4 then makes use of the force(s) being exerted by the external environment on the exoskeleton 1 as determined during the operation in measurement mode in order to perform force servocontrol and, where necessary, in order to compensate the force(s) being exerted by the external environment on the exoskeleton 1. More precisely, if the force measured during measurement mode is different from the force estimated in default mode, then the forces exerted by the actuator(s) 3 are increased (by adjusting the powers delivered to the actuators) in order to approach the force measured in measurement mode. When the exoskeleton 1 is put into operation, it is considered in default mode that no force is being exerted by the external environment on the exoskeleton 1.

The exoskeleton 1 then operates in its default mode until it detects a movement that is known to the computer 4.

An example of operation involves carrying an object.

When the computer 4 recognizes from the movement of the user that the user is about to take hold of an object or that the user is taking hold of an object, the computer 4 switches into measurement mode.

The computer 4 then measures the force that the exoskeleton 1 itself needs to exert in order to carry the object (since as a result of the automatic learning, the path servocontrol compensates for the muscular force of the user) and it deduces therefrom the weight of the object.

The computer 4 then switches back to default mode and makes use of the measured weight of the object in order to perform appropriate force servocontrol.

Naturally, that is merely one particular example of operation. In more general manner, the computer 4 can switch to measurement mode for movements that are different, e.g. such as pushing or pulling an object. The computer 4 then seeks to measure the force and the direction of the force exerted by the object on the exoskeleton 1.

The computer 4 thus switches in regular manner from one mode of operation to another so as to provide assistance to the movements of the user in a manner that is accurate, dynamic, and appropriate over time. In a particular embodiment, the computer 4 is configured to switch to measurement mode each time the computer 4 recognizes a movement that has been learnt by said computer 4.

Advantageously, operation in measurement mode lasts for only a short duration, typically lying in the range 0.3 seconds (s) to 3.5 s, and preferably in the range 0.5 s to 3 s, just long enough to determine the external forces being exerted. This serves to make operation in measurement mode imperceptible, or almost imperceptible to the user. This makes the exoskeleton 1 more ergonomic for the user. Also, this makes it possible to have no need to predict the movement of the user during a stage that is too long.

It should be observed that the exoskeleton 1 as described above has only two sensors, one for movement and the other for forces.

Also, the exoskeleton 1 as described above operates without any user/environment interface enabling the user to identify the level of assistance that the exoskeleton 1 is to provide. Furthermore, the exoskeleton 1 as described above operates without any sensor being worn directly by the user, and in particular without any biometric sensor.

The above-describe exoskeleton 1 is thus found to be particularly ergonomic.

Furthermore, the exoskeleton 1 can operate even if the user is acting in an unknown environment. For example, the exoskeleton 1 is capable of operating without it being necessary for the objects that are to be carried to have weights that are predetermined.

Naturally, the invention is not limited to the embodiment described, and variant embodiments may be provided without going beyond the ambit of the invention as defined by the claims.

In particular, although in this example, when in default mode, the computer automatically learns at least one movement performed by the robotic device during the operation of the robotic device, it is possible in a variant or in addition for the computer to perform automatic learning of at least one movement that is performed by the robotic device during a dedicated learning stage (the robotic device then being used solely for training the computer and not for assisting a user to perform tasks). As a variant or in addition, the computer could equally well include a database containing a predetermined list of models of movements performed by the robotic device under force servocontrol.

Also, the device could include, or could be associated with, numbers of force sensors and/or of path sensors that are greater than described above. Nevertheless, it is desirable to limit the number of indicator elements for reasons of cost, feasibility, ergonomics, maintenance, . . . .

Although in this example everything is incorporated in the robotic device, it is possible for some of the elements to be remote from the device (e.g. such as a power supply for the device, . . . ).

Although the device is suitable for operating without any sensor worn directly by the user, the user could wear sensors, e.g. for reasons of redundancy in the event of the device failing.

The invention claimed is:

1. A method of assisting at least one movement of a user by means of a robotic device, the robotic device operating without the user wearing directly any sensor, such as a biometric sensor, and without any user/environment interface for the user to identify a level of assistance that is to be provided, the method enabling the robotic device to be caused to operate in at least the following two modes:

default mode: force servocontrol of the robotic device via a computer of the robotic device; and measurement mode: path servocontrol of the robotic device, via the computer, with the computer storing at least one force exerted on the robotic device by an environment external to said robotic device;

the method being defined:

during recognition by the computer of a movement performed by the robotic device, as already learnt and stored by the computer, to switch from default mode to measurement mode in order to store at least one force exerted on the robotic device by an environment external to the robotic device; and then to return to default mode while making use of said stored force to perform the force servocontrol in said default mode.

2. The method according to claim 1, wherein the computer performs automatic learning of at least one movement carried out by the robotic device.

3. The method according to claim 2, wherein the automatic learning is performed during default mode.

4. The method according to claim 2, wherein the automatic learning is performed during a dedicated preliminary stage.

5. The method according to claim 1, wherein the path servocontrol is servocontrol via a succession of positions.

6. The method according to claim 1, wherein the path servocontrol is velocity servocontrol.

7. The method according to claim 1, wherein the robotic device is an exoskeleton.

8. A robotic device comprising a computer configured to provide force servocontrol of the robotic device, the computer being arranged, during recognition of a movement carried out by the robotic device as already learnt and stored by the computer, to provide the robotic device with path servocontrol while storing at least one force exerted by an external environment on the robotic device so that, on returning to force servocontrol, it can make use of the stored force(s) to perform force servocontrol, the robotic device operating without the user wearing directly any sensor, such as a biometric sensor, and without any user/environment interface for the user to identify a level of assistance that is to be provided.

* * * * *